United States Patent Office 3,471,323
Patented Oct. 7, 1969

3,471,323
PROCESS FOR FORMING A BAKED FILM OF INORGANIC MATERIALS
Akio Yamashita, Ikeda-shi, and Takehiro Tsuzaki and Tadashi Yamada, Toyonaka-shi, Japan, assignors to Matsushita Electric Industrial Co., Ltd., Oadoma-shi, Osaka, Japan, a corporation of Japan
No Drawing. Filed Apr. 18, 1966, Ser. No. 543,042
Claims priority, application Japan, Apr. 30, 1965, 40/26,054; May 28, 1965, 40/37,095
Int. Cl. B44d 1/42, 1/46
U.S. Cl. 117—201          4 Claims

ABSTRACT OF THE DISCLOSURE

Forming a baked film of cadmium sulfide or zinc sulfide by dispersing the same in powdered form in a solution of a metal oxide in acid or alkali and applying the solution to a base material which is then fired.

---

The present invention relates to a process for the preparation of a baked film, characterized by sintering the powder of metal, semiconductor, insulator and the like with the oxide.

Generally the sintering of the powder has, heretofore, been effected by the following method. For example, in the sintering of the powder of metal, it is baked at the temperature of about ⅔ of its melting point, after the powder has been molded with pressure, and the parts of the powder contacted are bound each other owing to the mechanism such as condensation and diffusion. However, such process requires a considerably high temperature, and in most cases, the sintering must be effected in vacuo according to the condition of the metal.

In sintering of ceramics, as well-known, the powder of an insulator is sintered by mixing with some glassy material which has lower melting point, at such high temperature that the insulator might not melt but the glassy material might melt. Such process also requires a considerably higher temperature. Generally, the insulators are baked at approximately 1000° C.

As well-known in the sintering of the semi-conductor, particularly CdS, a halide which acts as a flux to the semi-conductor is mixed with the semi-conductor and the mixture is heated above the melting point of the halide to melt the semi-conductor with the halide. After cooling, the semi-conductor is recrystallized and sintered simultaneously. In this process also the sintering generally requires a temperature of about 600° C.

As above-mentioned, any of conventional process requires a higher sintering temperature. Therefore a base plate on which a baked film is formed must have a certain limit on heat resisting property thereof.

The present invention relates to a process for forming a baked film by baking a powder of an inorganic material such as metal, semi-conductor and insulator at a low temperature of about 150°–250° C. The principle on which the invention is based is as follows: an oxide is dissolved in a solvent or flux such as acid or alkali and then an inorganic material is dispersed in the solution, and the solution thus obtained is coated on a suitable base plate such as glass, plastics, metal and the like. Upon baking the plate at a lower temperature of about 150°–250° C., the oxide in molecular state is recrystallized to bind the powder together. When the amount of the oxide is suitable, it is recrystallized so thinly on the powder surface as to obtain a baked film of which physical properties can be almost determined by the physical properties of the powder.

When the oxide is recrystallized, the recrystallization is effected easily and the binding condition of inorganic powder is improved extremely in the presence of a halide. The following table shows typical oxides which are selected and the solvent or flux thereof such as acid and alkali.

| Oxide: | Solvent or flux |
|---|---|
| Zinc oxide | Acid, alkali, $NH_4Cl$. |
| Antimony oxide | HCl, KOH, tartaric acid, acetic acid. |
| Indium oxide | HCl. |
| Cadmium oxide | Acid, ammonium salt. |
| Gallium oxide | Acid, alkali. |
| Gold oxide | HCl. |
| Silver oxide | Acid, $NH_4OH$, KCl. |
| Cobalt oxide | Acid. |
| Tin oxide | Conc. $H_2SO_4$. |
| Titanium oxide | $H_2SO_4$, Alkali. |
| Copper suboxide | HCl, $NH_4Cl$, $NH_4OH$. |
| Lead oxide | Alkali. |
| Nickel oxide | Acid, $NH_4OH$. |
| Manganese oxide | HCl. |
| Phosphorus pentoxide | $H_2SO_4$. |

These oxides are dissolved in the state of extremely fine particles, accordingly their surface energy is large. Thus, the fine particles are readily condensed around a larger powder which is added. When the solvent or flux is removed by heating or other step, the crystal of the oxide grows and the powder is bound each simultaneously. It will be noted that when the baked film is required to have too many physical properties of the powder, the powder should be less soluble or fusible in the solvent or flux, accordingly to the class of the solvent or flux must be selected.

Some examples of the invention are shown as follows.

Example 1

Zinc sulfide is employed as the powder. This zinc sulfide on which an activator such as copper, aluminum and the like has been doped, can be employed as an electroluminous body.

Zinc oxide is used as the oxide, because of the characteristic that the luminous brightness of zinc sulfide is extremly increased by a small amount of zinc oxide which exits in the baked film of zinc sulfide.

Acetic acid is used as a solvent. Zinc oxide is soluble in acetic acid, but zinc sulfide is insoluble in it. When zinc sulfide, zinc oxide and acetic acid are intermixed together, the fine particles of zinc oxide are condensed around the powder of zinc sulfide. Upon the removal of acetic acid by heating such mixture to about 150° C., the crystals of zinc oxide grow and the powder of zinc sulfide is bound together. In this case, if an amount of added zinc oxide is selected suitably, it is possible to make the layer of zinc oxide between the powder of zinc sulfide extremely thin, as zinc sulfide has become very fine particle.

Now, it will be noted that the baked film can be formed directly on a conductive glass, since the baking temperature is very low, and an electro luminescent lamp is prepared by vacuum evaporation of aluminum on the baked film. The luminous brightness of the lamp is characterized by being very bright owing to the addition of zinc oxide.

At this time, if a halide, for example, ammonium chloride, with the exception of the above composition exists, the effects to increase the viscosity of the mixture and facilitate to condense zinc oxide are obtained.

Example 2

Cadmium sulfide as the powder, on which an activator such as chlorine is doped, cadmium oxide as the oxide and an aqueous solution of ammonium chloride as the solvent are employed respectively. Hereupon, cadmium oxide which amount thereof is suitably selected can bind the powder of cadmium sulfide each other with a small amount thereof and proves to promote its photoelectric sensibility. Of course, if cadmium chloride is employed as the halide in this case, the condensation of cadmium oxide is also facilitated.

In case of other metals, insulators and the like, the principle for binding the powder with the oxide is invariable.

As in the above detailed description, according to the present invention the baked film can be formed at an extremely low temperature such as room temperature to several hundred degrees C. The base plate having a low melting point such as plastics, glass and the like can be employed, and the industrial utilization to the apparatus employing the tape and the like is great.

What is claimed is:

1. A process for forming a baked film of an inorganic material selected from the group consisting of zinc sulfide and cadmium sulfide which comprises dispersing powders of said inorganic material in a solution of a metal oxide in acid or alkali, applying the dispersion onto a base material selected from the group consisting of glass, plastic, and metal and firing the base material.

2. A process according to claim 1, wherein the base material is fired at a temperature of about 150°–250° C.

3. A process according to claim 1 wherein a metal halide is used together with the metal oxide.

4. A process according to claim 1 wherein the oxide is selected from the group consisting of zinc oxide, antimony oxide, indium oxide, gallium oxide, gold oxide, silver oxide, cobalt oxide, tin oxide, titanium oxide, copper sub-oxide, nickel oxide, manganese oxide and phosphorus pentoxide.

References Cited
UNITED STATES PATENTS 2,235,802   3/1941   Voreaux.

WILLIAM L. JARVIS, Primary Examiner

U.S. Cl. X.R.

117—33.4, 230